(12) United States Patent
Zino et al.

(10) Patent No.: US 7,184,429 B2
(45) Date of Patent: Feb. 27, 2007

(54) ADAPTIVE CALL ROUTING SYSTEM

(75) Inventors: Galeal Zino, Plainsboro, NJ (US); Tom Evslin, Princeton, NJ (US); Brad Miller, Cranbury, NJ (US)

(73) Assignee: ITXG IP Holdings S.A.R.L., Luxembourg (LU)

( * ) Notice: Subject to any disclaimer, the term of this patent is extended or adjusted under 35 U.S.C. 154(b) by 201 days.

(21) Appl. No.: 10/166,418

(22) Filed: Jun. 10, 2002

(65) Prior Publication Data

US 2003/0231595 A1    Dec. 18, 2003

(51) Int. Cl.
*H04L 12/66* (2006.01)
(52) U.S. Cl. ............. 370/352; 370/351; 370/356; 370/389; 370/441; 370/445; 370/401; 709/218; 709/235; 709/239; 709/240
(58) Field of Classification Search ............ 370/351, 370/352, 356, 389, 401, 353, 441, 445; 709/218, 709/235, 238, 239, 240, 226, 228, 229
See application file for complete search history.

(56) References Cited

U.S. PATENT DOCUMENTS

| | | | | |
|---|---|---|---|---|
| 5,911,134 A | * | 6/1999 | Castonguay et al. ........... 705/9 |
| 6,216,154 B1 | * | 4/2001 | Altschuler et al. ........... 709/203 |
| 6,480,898 B1 | * | 11/2002 | Scott et al. ............... 709/238 |
| 6,570,849 B1 | * | 5/2003 | Skemer et al. ........... 370/230.1 |
| 6,570,855 B1 | * | 5/2003 | Kung et al. ............... 370/237 |
| 2003/0133407 A1 | * | 7/2003 | Segev et al. .............. 370/229 |
| 2003/0152210 A1 | * | 8/2003 | Delaney et al. ......... 379/220.01 |

* cited by examiner

*Primary Examiner*—Chi Pham
*Assistant Examiner*—Raj Jain
(74) *Attorney, Agent, or Firm*—Kaplan Gilman Gibson & Dernier LLP

(57) ABSTRACT

A system, method and apparatus are presented for the adaptive optimization of call quality and marginal profit in a telephony over data network, where the network contains a plurality of destinations, where calls are routable to each destination via a plurality of gateways in route to such destination, and where said gateways may serve more than one destination. The method comprises continually monitoring call traffic to each destination to first analyze whether the destination is currently volatile. If it is not, no action is taken. If it is, the method then reallocates the destination's traffic among some or all of the gateways in route to it.

12 Claims, 6 Drawing Sheets

ADAPTIVE CALL ROUTING SYSTEM

FIELD OF THE INVENTION

The present invention relates to telephony over packet switched data networks. More particularly, the present invention relates to a system and method for the real time monitoring, evaluation of and adaptive optimization of telephone-call quality of service and per call marginal revenue in data-network based telephony networks.

BACKGROUND OF THE INVENTION

Data Network Telephony

Data networks such as the Internet are now being used to transmit voice. Such data-network-based telephony networks provide an alternative to public-switched telephone networks ("PSTNs") for placing telephone calls.

FIG. 1 depicts a schematic diagram of a system 100 for conventional voice communications over a data network. The system includes data network 102 and public-switched telephone networks ("PSTN") 120 and 122. The specifics of the architectures and communications protocols of such systems are not described herein except to note that they are quite different from one another such that direct communication therebetween is not possible without converting formats, protocols, etc. It will be appreciated that while two PSTNs (i.e., PSTN 120 and 122) are depicted, there is, at least functionally, only one worldwide PSTN. Communication between a PSTN and a data network is implemented via a "gateway." In the general sense a gateway is an entrance to and an exit from a communications network. A gateway is typically an electronic repeater device that intercepts and translates signals from one network to another. A gateway often includes a signal conditioner that filters out unwanted noise and controls characters. In data networks, gateways are typically a "node" on both networks that connects two otherwise incompatible networks. Thus, gateways often perform code and protocol conversions. Such an operation would be required for communication between a PSTN and a data network. Assuming an analog voice signal is delivered from the PSTN, the gateway digitizes that signal from the PSTN and encodes it and transmits it as "packets" (hereinafter "digitized voice signal") over the data network according to data network protocols. In other embodiments, the signal from the PSTN is a digital signal, such that analog-to-digital conversion is not required. Protocol conversion is still required.

An element associated with a gateway is a "gatekeeper." A gatekeeper is responsible for gateway registration, address resolution and the like. A gatekeeper may be viewed as the router that directs a digitized voice signal to a "terminating" gateway (i.e., a gateway that provides protocol conversion for transmission over a PSTN, for example, to a telephone). As used herein, the term "gateway" includes both the gateway and gatekeeper functions.

System 100 therefore also includes gateway 110 that acts as a conduit between PSTN 120 and data network 102, and gateway 112 serving as a conduit between data network 102 and PSTN 122. The system further includes telephone 130 that is connected, via link L1, to PSTN 120 and telephone 136 that is connected, via link L8, to PSTN 122. The links that are depicted in FIG. 1 are, as is well known, trunk lines, trunk groups, etc., as appropriate.

In operation, voice message 140 from telephone 130 is transmitted over link L1 to PSTN 120. Within PSTN 120, voice message 140 is routed to switch S2 over link L2. Switch S2, the operation of which is well known in the art, will typically route voice message 140 to another switch (not shown) over a trunk group (not shown). In such a manner, voice message 140 moves through PSTN 120 being routed from switch to switch until it is carried over a final link L3 out of PSTN 120. Voice message 140 is then carried, over link L4, to gateway 110. "Originating" gateway 110 performs protocol conversion and digitizes, as required, voice signal 140. Voice message 140 is then routed (the gatekeeper's function) into data network 102. For clarity of presentation, the voice message will be assigned the same reference numeral (e.g., 140), notwithstanding the fact that the signal carrying the message is physically changed during transmission through the system.

Message 140 is transmitted over call path DNCP to "terminating" gateway 112 wherein the signal leaves data network 102. Note that the designation "originating" or "terminating" applies on a call-by-call basis. In other words, for a first call, a particular gateway can be an originating gateway, while for a second call, that same gateway can be a terminating gateway. Moreover, packets typically flow in both directions since both parties typically talk.

A call path through a data network, such as call path DNCP through data network 102, is not fixed according to a defined hierarchy as in a PSTN. Rather, an originating gateway "selects" a terminating gateway and the voice signal is routed by successive network elements (e.g., routers, bridges, etc.) through the data network to the terminating gateway. Since routing decisions are made by each network element, call path DNCP is not a priori known or set.

Gateway 112 receives voice message 140 and converts it to a form suitable for transmission through PSTN 122. Voice message 140 is delivered over link L5 to PSTN 122. Within PSTN 122, voice message 140 is routed via over links, such as link L6, to switches, such as switch S4. Voice message 140 is carried over link L7 out of PSTN 122 to link L8 to telephone 136 to complete the call.

Often there is more than one gateway 112 capable of terminating the call. An originating gateway may allocate calls to plural terminating gateways based on plural factors such as price, quality, availability, desire to equally distribute calls among terminators, etc. However, such allocations do not ensure that the system is always configured optimally, since all of the parameters effecting the allocation among terminating gateways change rapidly and somewhat independently of each other.

SUMMARY OF THE INVENTION

A system, method and apparatus are presented for the adaptive optimization of call quality and marginal profit in a telephony over data network, where the network contains a plurality of destinations, where calls are routable to each destination via a plurality of gateways in route to such destination, and where said gateways may serve more than one destination. The method comprises continually monitoring call traffic to each destination to first analyze whether the destination is currently volatile. If it is not, no action is taken. If it is, the method then reallocates the destination's traffic among some or all of the gateways in route to it. Such reallocation determines the expected call traffic to the destination for the next defined time interval, predicts which gateways in route to the destination are likely to provide substandard quality of service (QoS) in the next defined time interval, calculates the marginal profit per call at each of the regular gateways in route to the destination, and allocates among the regular gateways the destination's overall call traffic, where such allocation is a function of the marginal profit at that gateway and the expected overall call traffic to the destination. A destination is considered as volatile based upon (i) significant changes in call volume between the last two consecutive time intervals, (ii) change in the real-time quality level of an in-route gateway, or (iii) overall unacceptable quality at the destination.

DETAILED DESCRIPTION OF THE PREFERRED EMBODIMENTS

Figure 1:
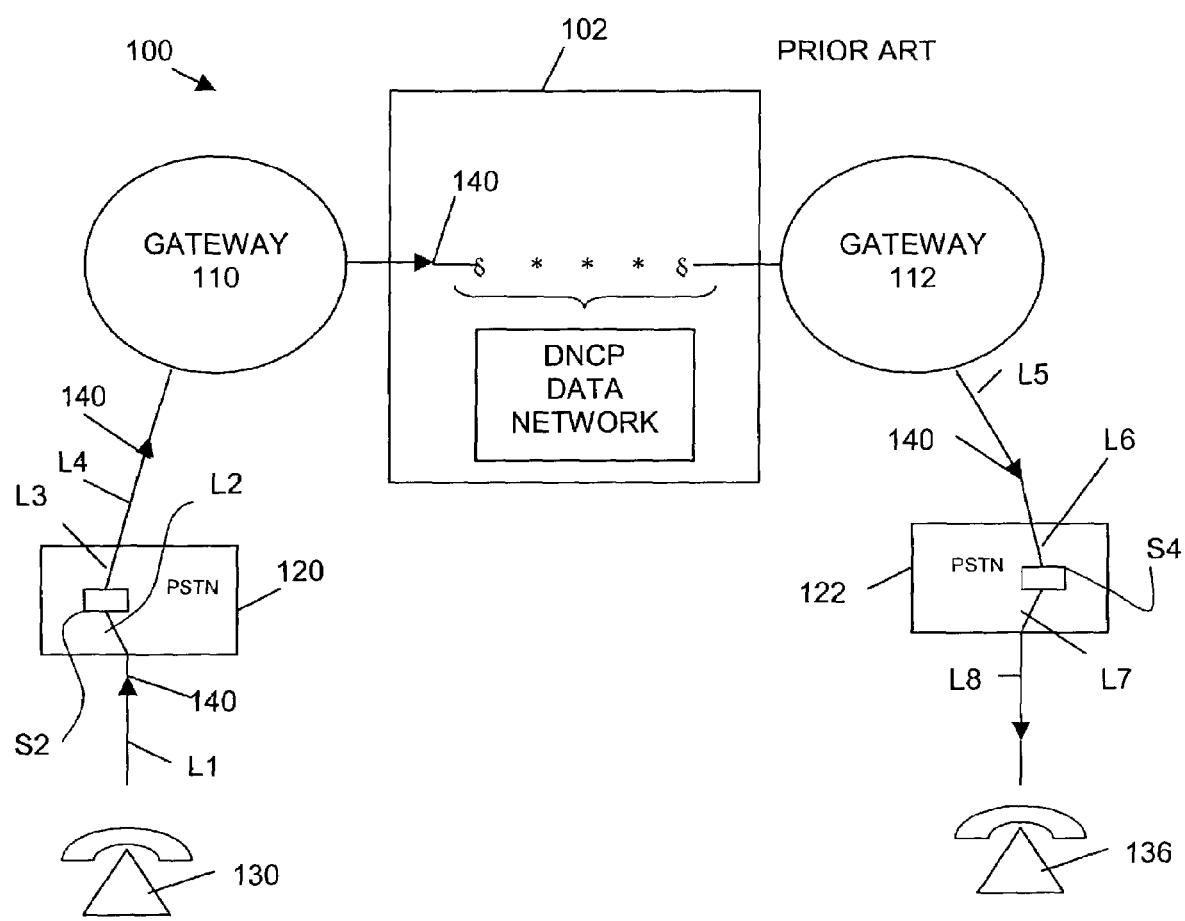
FIG. 1 depicts voice communications over a data network in the prior art.

The present invention solves the above and other problems of the prior art by combining all of the margin/QoS optimization processes described above to create one all-encompassing, closed loop, automated, real-time system. At a high-level perspective, the system of the present invention has one or more of the following functionalities:

1. Methods to collect QoS data in real-time. The critical factor in measuring QoS is getting enough data to have statistically significant sample sizes, while still keeping the data size in manageable slices for the algorithms to process fast enough. To do this, the data is preferably collected and parsed in dedicated servers, with only the most critical summary data being processed by the system algorithms.
2. Algorithms that calculate the probabilities of network elements operating with unacceptable QoS, even if such network element or elements is/are currently operating in an acceptable state.
3. Algorithms that predict future traffic patterns based on current and historical traffic patterns.
4. Algorithms that simultaneously optimize QoS and margins in real-time.
5. Interfaces and adapters that allow the results of the system processing to be propagated to network elements in real-time.
6. Feedback mechanisms between system databases, Least Cost Routing ("LCR") and business logic databases, and network element databases to create a closed loop control path.

The present invention thus automatically and simultaneously adaptively optimizes network quality and margins in real-time.

Before one or more embodiments of the invention are explained in detail, it is to be understood that the invention is not limited in its application to the details of construction or the arrangements of components set forth in the following description or illustrated in the drawings (the terms "construction" and "components" being understood in the most general sense and thus referring to and including, in appropriate contexts, methods, algorithms, processes and subprocesses). The invention is capable of other embodiments and of being practiced or being carried out in various ways. Also, it is to be understood that the phraseology and terminology used herein is for the purpose of description and should not be regarded as in any way limiting.

For purposes of illustration, the invention will be described within the context of the following exemplary scenario: a telephony over data-network system, utilizing the Internet as the data network, and effectuating telephone calls between various destinations around the world. A destination can be a city, a part of a city, or, as is convenient in most telephony applications, a set of telephone customers served by a certain common set of digits in a telephone number, such as an area code (e.g., 212), or an area code plus an exchange (e.g., "212-455") or any other defined sequence of numbers within a telephone number (e.g., "212-455-9XXX").

It is assumed in the example scenario that there is a significant amount of historical data readily available regarding call frequency and volume to each of the supported destinations, which is stored in a form that can be readily utilized in real time computations. It is further assumed that each destination is serviced by multiple gateways, and that each gateway may serve more than one destination, thus providing flexibility, redundancy and the ability to allocate call terminating ports as a function of demand. A depiction of such an example telephony system appears in FIG. 2.

Figure 2:
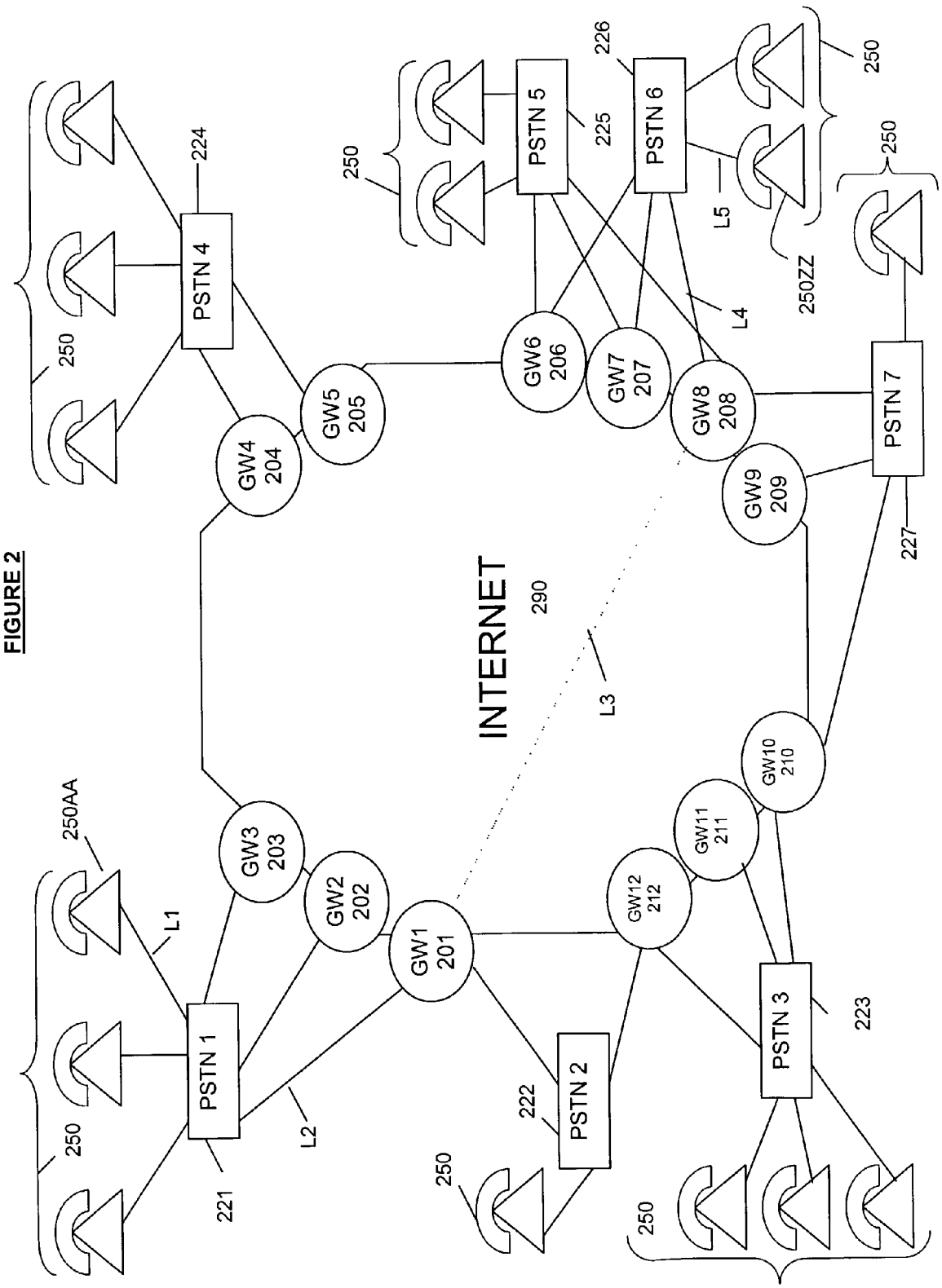
FIG. 2 depicts an exemplary robust system for voice communications over a data network utilizing multiple gateways for each destination, where many gateways are in route to multiple destinations.

With reference to FIG. 2, the Internet 290 is the data network across which telephone calls originating with and ending at telephones 250 are routed. Each call enters its local originating PSTN 221–227, and from there is switched to a gateway 201–212. The gateways, as described above, bridge between the PSTNs 221–227 and the data network, in this case the Internet 290. The network administrator has call setup, routing and control computers (not shown) which establish and route calls across the Internet from one gateway to another, as is known in the art. At the destination side the call is switched by the destination gateway to the destination PSTN, which in turn switches the call to the receiving telephone. As an example, assume a call originates at telephone 250AA and is destined for telephone 250ZZ. The call enters PSTN1 221 over leg L1 and from there is switched over leg L2 to gateway GW1 201. The network operator establishes a connection between gateway GW1 201 and gateway GW8 208 at a remote destination. Such virtual connection is designated by link L3. The call is routed to GW8 208 and from there switched to destination PSTN6 226, which in turn switches it to receiving telephone 250ZZ. Each PSTN has multiple gateways which are in route as shown. Each of these gateways serve multiple PSTNs as also shown. The terminating gateways are usually not connected directly to the originating gateways, instead communicating over the Internet through one or more routers and packet switches as is conventional.

Given the multiple gateway per destination, multiple destination per gateway structure, and the fact that the plurality of gateways within the data network are not in general homogenous, there will be variations in cost and quality associated with routing calls to a particular destination via one gateway as opposed to via another.

From a data-network based telephony standpoint, the ideal situation is that the highest quality gateways are always available to handle any increase in call volume, and that such highest quality gateways always operate at the lowest available cost. In the real world this ideal is obviously never realized. The system of the present invention operates to best allocate the available resources so as to optimize both quality and profit margins. Moreover, as described above, in the context of data network telephony it is simply not enough to adjust to shifting demand and QoS in a reactive way; a system must anticipate trends—in call traffic as well as in QoS—in their nascency, and adapt the network topology to meet such trends as they unfold.

For clarity of explanation, the illustrative embodiments of the present invention are presented as a collection of individual functional blocks. The functions that such blocks represent can be provided using either shared or dedicated hardware, including, without limitation, hardware which can execute software. Illustrative embodiments may comprise general processor and/or DSP hardware, read-only memory (ROM) for storing software performing the operations described below, memory (RAM) for storing computational results and for storing call data, as well as memory for storing pre-established rules for evaluating call quality.

Figure 3:
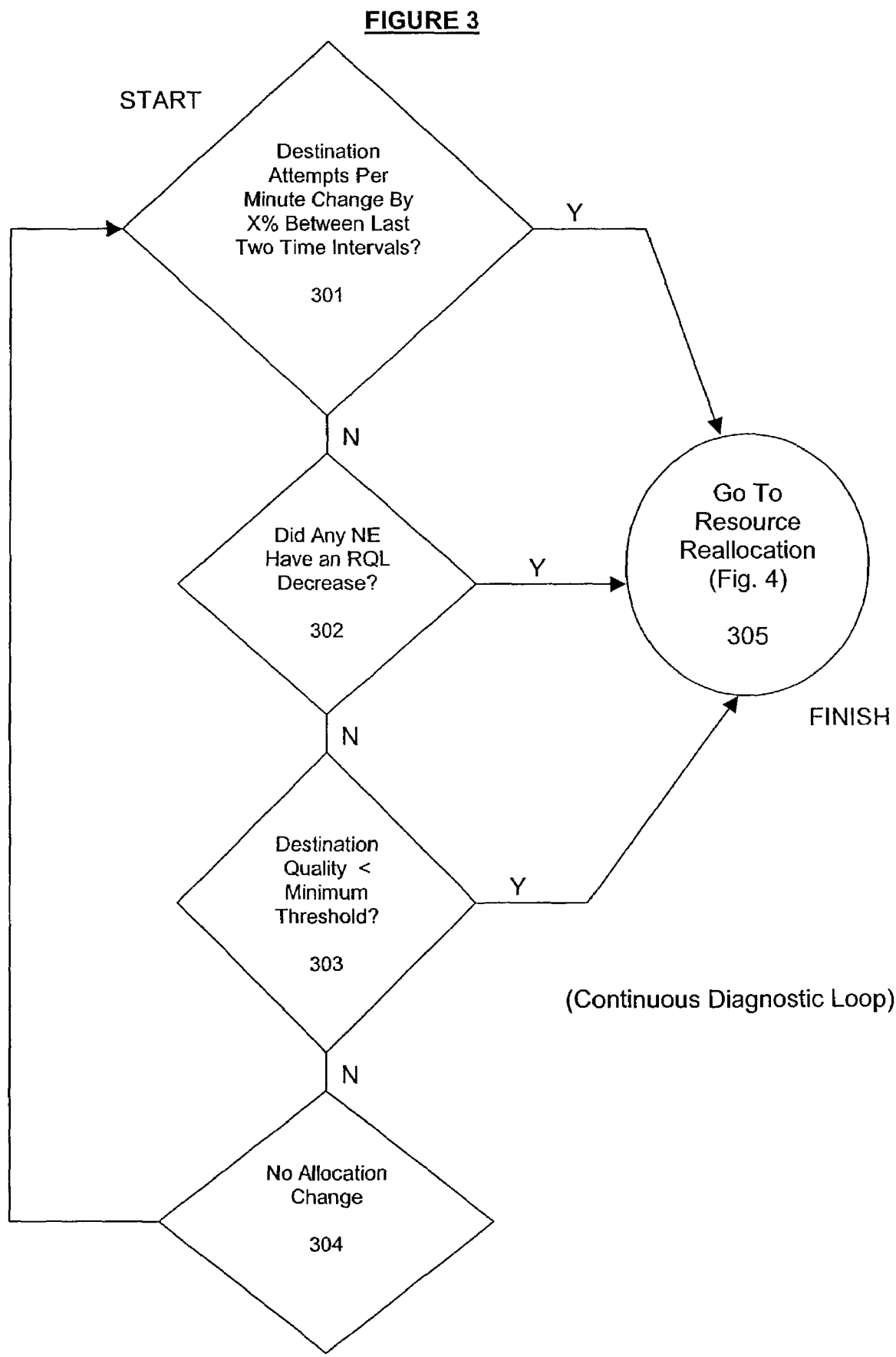
FIG. 3 is a high level continuous loop resource diagnostic process flow diagram according to the present invention.
Figure 4:
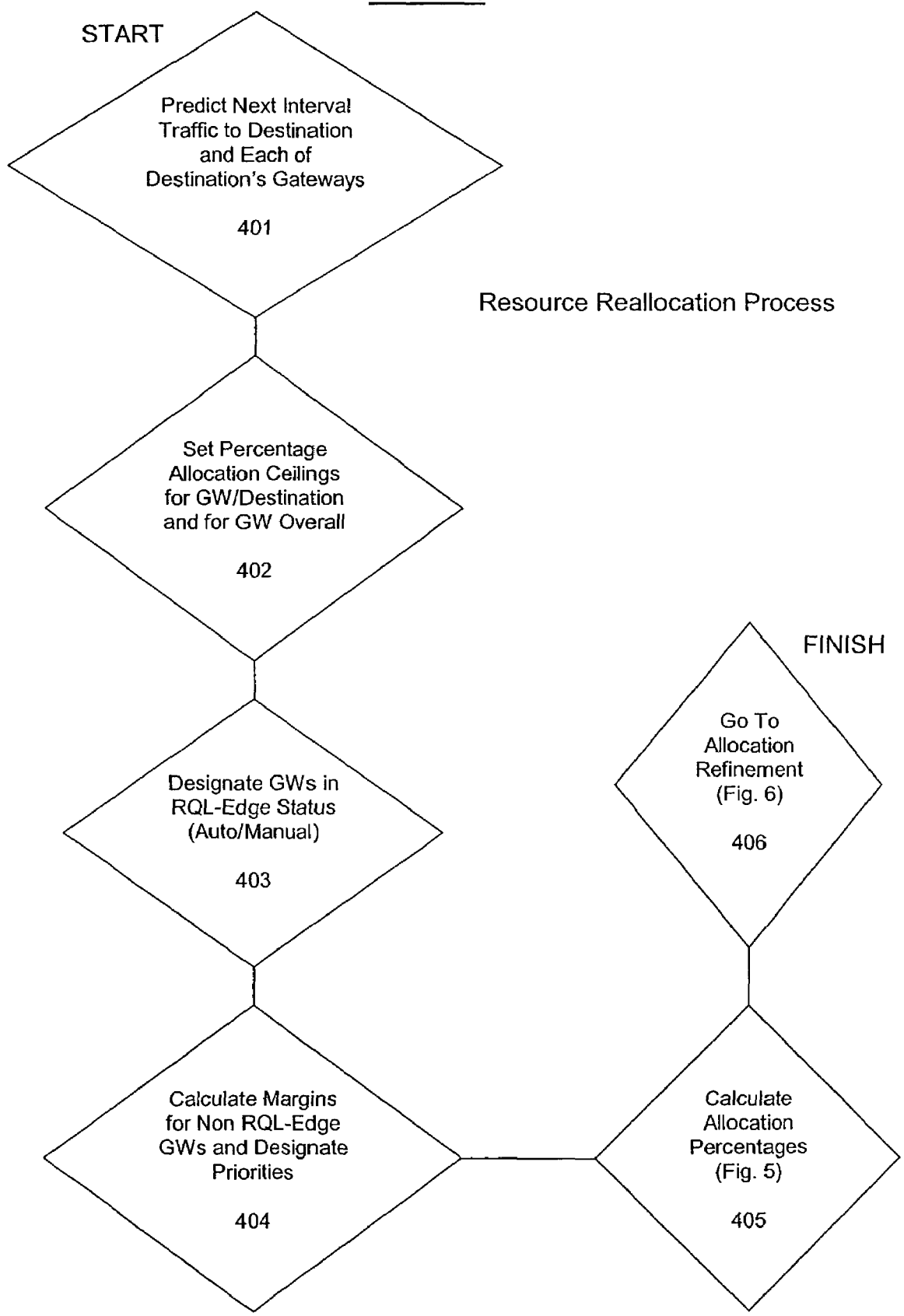
FIG. 4 is a high level process flow diagram for resource allocation according to the present invention.
Figure 5:
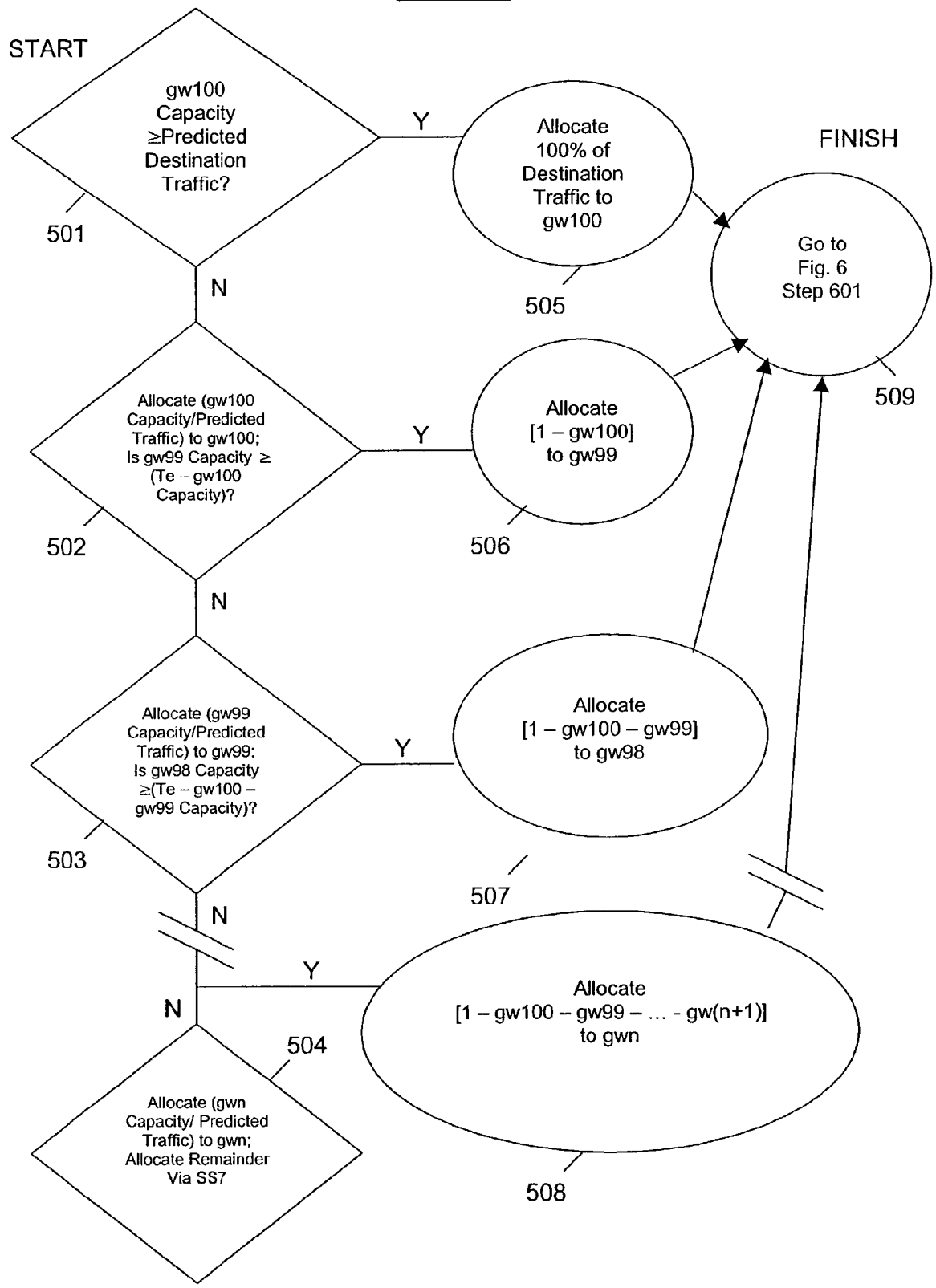
FIG. 5 is an exemplary sub-process flow diagram for setting gateway allocations for a destination according to the present invention.
Figure 6:
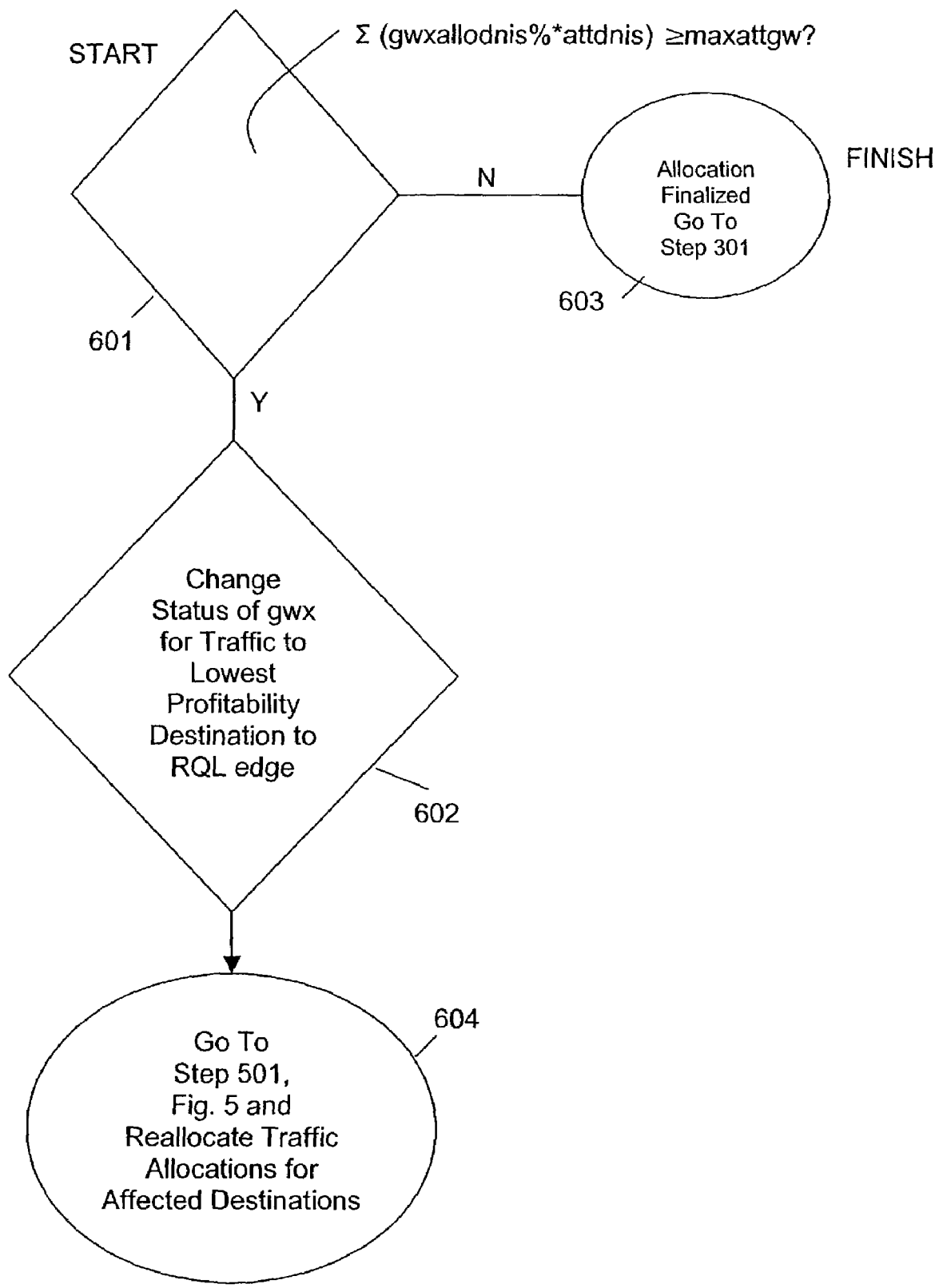
FIG. 6 is a sub-process flow diagram for refining the conclusions of the data processing depicted in FIG. 4.

There are two general processes which comprise the system and method of the present invention, depicted in FIGS. 3–4. These top level processes will be next described. Each of these high level processes itself has one or more detailed sub-processes, and these are depicted in FIGS. 5–6.

With reference to FIG. 3, there is depicted a continuous process loop, whose function is to determine if an event triggering a reallocation of call traffic has occurred. The system can operate on one destination at a time, and can thus be set by the system operator to continually check each destination in succession, or the algorithms can run in parallel, continually monitoring each destination in the network, and spawning reallocations as necessary. In the diagnostic loop of FIG. 3, the system checks for the existence of the three triggering events at a given destination: (i) a significant change in the call traffic to the destination (step 301), whether such significant change is an increase or a decrease, (ii) any gateway in route to the destination being monitored experiencing a change in its real-time quality designation level (step 302), and whether the destination's overall quality has decreased below a defined threshold (step 303). If so, the process flow immediately moves to step 305, which initiates the reallocation process of call traffic to the impacted destination.

Some further details regarding steps 301 through 303 are in order. Step 301 tests for significant call traffic change. In order to run this test, a time interval must be defined, say a given number of minutes, N. The test asks if attempts/minute to the destination in the time interval immediately preceding the current one have changed by or more than some percentage value X defined to be "significant." In general the network operator will set the values of N and X empirically. Convenient choices for N and X have been found to be 20 minutes and 20%, respectively. Thus, mathematically, the test at step 301 asks if call attempts to the destination during the interval (t–N through t=0) have changed relative to the time interval (t–2N through t–N) by |X| %, where X is some rational number. Using the convenient values provided, the test reduces to asking if call attempts to the destination have changed by more than 20% between the last two consecutive 20 minute samples.

Step 302 asks if any gateway in route to the destination under consideration has had a change in its real-time quality level (RQL). Whether this has happened depends on how quality thresholds are defined by the network operator, and can vary as to granularity. A convenient threshold is if a certain gateway has gone from a low percentage— e.g., 20%—of all calls routed to it in the last Y minutes—e.g., Y=10— being rejected or having failed to a high percentage, e.g., 80%, of routed calls being rejected or failing. In a preferred embodiment of the invention RQL status is maintained by the network operator for all network elements, and is essentially quality levels on a per element, per destination basis that correlate with industry standards for toll quality, tier one quality, tier two quality, etc.

Step 303 asks a similar question as does step 302, except that this time it is at the overall destination level. Similarly to step 302, the network operator will empirically define test criteria, such as, e.g., a useful maximum threshold of call rejections/failures for acceptable quality. Under such criteria, if a destination exceeds the threshold, its overall quality assumes unacceptable status.

In the event no triggering event is identified, the process returns to step 301 and begins anew. If a triggering event is located, the process sequence moves to FIG. 4, and call traffic reallocation begins for the destination in question.

With reference to FIG. 4, at Step 401, the system first predicts, for the next time interval (i.e., t=0 through t=N), the call traffic to the destination and to each of the gateways in route to the destination. As described above, since each gateway in route to a destination can also service other destinations, both predictions are necessary. The prediction algorithm itself is based upon historical call data, and will be described below in more detail. In one embodiment a prediction algorithm which assumes a linear change is utilized; predicted call attempts for the upcoming time period equals (previous time period attempts)*(percent change between the last two time periods).

Once the predicted call traffic has been calculated, at step 402 the percentage allocation ceilings for (i) each gateway on a per destination basis, and (ii) for each gateway on a per gateway basis, are set. These results are used in the ultimate calculation of the allocation portions (or percentages) of destination traffic for the gateways serving that destination. In real world systems what is actually allocated at a particular gateway to a given destination is generally a certain number of ports. The call minutes that can be terminated at these ports depends on various factors. Thus for convenience as well as correlation with actual systems, the setting of ceiling allocations will be thus described in terms of ports and yield as independent variables.

The percentage allocation ceiling for each gateway on a per destination basis, maxdnis %, and the percentage allocation ceiling for each destination on a per gateway basis, maxattgw, are found as follows:

Portsavaildnis is the number of gateway ports available to a destination during the time period;

minavaildnis is the number minutes that a gateway can terminate to a destination during the time period;

attavaildnis is the number of attempts that a gateway can terminate to a destination during the time period; and yield is the number of minutes gateways can terminate per port per minute (obtained using Erlang calculations).

mpa=minutes/attempts (on a per gateway or per destination basis);

portsavaildnis=the total gateway ports available for a destination–ports currently in use to the destination (estimated)

minavaildnis=portsavaildnis*(time period minutes*yield)

attavaildnis=minavaildnis/MPA for a destination maxdnis %=attavaildnis/totalattdnis Portsavailgw is the number of available gateway ports during the time period minavailgw is the number of minutes that gateway can terminate to all destinations during the time period attavailgw is the number of attempts that gateway can terminate to all destinations during the time period portsavailgw=total gateway ports−ports currently in use minavailgw=portsavailgw*(time period minutes*yield)

attavailgw=minavailgw/MPA for entire gateway maxattgw=attavailgw/totalattgw.

At step 403 any gateways that are likely to perform below acceptable quality levels in the next time interval are identified, and they will not be allocated any significant call volume. Such gateways are referred to as being in real-time quality level (RQLedge) status. They can be allocated trickle outage so as to allow their QoS status to be monitored so that they can be used again at a later time. Such trickle outage, in one embodiment will be test or dummy calls, not carrying actual client communications, generated by the network for this monitoring purpose. Alternate embodiments may send actual client calls this way, and reroute them if they fail or are rejected. The test here is the detection by the system of statistically significant indicia, such as the detection of a statistical edge with a high probability of causing the gateway to operate below the RQL minimum threshold during the next time period. Alternatively, network operators can manually designate a gateway as being in RQLedge status.

Step 404 involves calculation of the margin dollars per call attempt for each gateway in route to the destination which is not in RQLedge status (or worse), i.e., that was not filtered out in step 403. Although the discussion so far has spoken in terms of calls routed to a destination via a gateway, for econometric reasons it is convenient to speak in terms of call attempts routed to a gateway. Not every call attempt is successful. Some are rejected by the gateway. Nonetheless, in many business models, each call attempted to be terminated on a gateway incurs a cost, payable to the local gateway operator. Thus, the actual billable minutes are diluted by unsuccessful call attempts.

As a result, in calculating the actual profit margins, one needs to know the call minutes per attempt (MPA) that each gateway will have in the upcoming time interval. This is what is actually calculated in step 401.

Margin dollars per attempt is calculated as follows. Margin dollars per minute=(gateway price/minute)−(average cost/minute), and margin dollars per attempt, or $peratt=MPA*(margin dollars per minute). $peratt thus provides a measure of relative profitability for gateways. Hence, in step 404 as well, each regular (non-RQLedge) gateway is given a priority number reflecting $peratt and RQLedge status to generate a priority list of available gateways to the destination under analysis. Gateways that are within 10% of each other are given equal priority numbers except for the gateway with the highest $peratt, which receives the highest ranking gw100. RQLedge gateways receive the lowest priority number.

Given the predicted call attempts to the destination, and the profitability/QoS based priority ranking, the traffic to the destination can now be allocated among the available gateways, at step 405. The details of this process are described below, in connection with FIG. 5.

At step 406 the percentage allocations made in step 405 are verified and iteratively refined, as described in detail below with reference to FIG. 6. Next, however, the particulars of the allocation process itself will be discussed in connection with FIG. 5.

Recall that at step 401 the predicted traffic to the destination was calculated. This value now needs to be allocated among the available gateways. At step 501 then, the predicted call traffic is compared to the available gateway capacity for the given destination at the highest ranked gateway gw100. The traffic and capacity can be expressed in any appropriate units. One convenient unit is to express the predicted traffic as predicted call minutes, by multiplying the predicted call attempts by the empirical minutes per attempt figure for the gateway. This value is then converted to ports needed by dividing by the yield, or the number of (call) minutes that a gateway can terminate per port per (interval) minute.

It is noted that in the calculations of FIG. 5 the term "capacity" in relation to a gateway refers to the capacity available to the destination under consideration, not the overall capacity of the gateway. This could be expressed as the number of ports on the gateway available to that destination, or, in terms of percentages, the percentage allocation ceiling for each gateway on a per destination basis, i.e., the maxdnis % variable described above.

Returning to step 501, if the capacity of gw100 is greater than or equal to the predicted traffic, at step 505 all traffic for the destination is allocated to gw100, and the process flow goes to step 601 of FIG. 6. If not, at step 502, a fraction of the traffic to the destination equal to (gw100 capacity/expected traffic) is allocated to gw100, and the remaining expected traffic ("TE"), or (TE−gw100 capacity) is compared to gw99's capacity. If gw99's capacity can absorb the remaining excess traffic, then at step 506 [1−(gw100 capacity/TE)] is allocated to gw99 and the process flow goes to step 601 of FIG. 6. If not, gw99 is allocated a proportion of the destination's traffic equal to (gw99 capacity/TE), and the allocation continues until all expected traffic has been allocated. If a given gateway gwn's capacity is greater than or equal to the remaining expected traffic (after subtracting the proportions of already allocated traffic) than that given gateway receives a proportion of the traffic equal to 1 less all of the proportions allocated to higher priority gateways [1−(gw99 capacity/TE)−(gw98 capacity/TE)− . . . −(gw(n+1) capacity/TE)]. If not enough to service the remaining unallocated traffic, it is allocated a proportion equal to its capacity divided by the total expected traffic, or [gwn capacity/TE].

In the calculations of FIG. 5, gateways with identical priority numbers (i.e., the gateways are within 10% of each other, as above) are treated as one large gateway, and then after allocation, the traffic allocated to them collectively is shared amongst them equally.

At step 504, if there is still remaining expected traffic which is unallocated, then the remainder fraction is sent via SS7 or other alternative means, there being no way to terminate this excess traffic to the destination using the gateways in route.

It is noted that in alternative embodiments it may be advantageous to allocate some small fraction of call traffic to lower priority gateways to facilitate monitoring their QoS levels, or for other convenient purposes, even where the higher priority gateways can absorb all of the traffic. i.e., where there exist gateways gw100 through gw96, and gw100 and gw99 can handle all of the TE. In such embodiments the above described allocation procedure would be modified to allocate a small percentage of call traffic to each and every gateway not in RQLedge status, e.g., in the example above allocating one percent of traffic to gw98, gw97 and gw96. For example, in such an embodiment, expressing allocations in percentages, and using 1% as the exemplary minimum allocation percentage, allocations would proceed as described by the following pseudocode, where the variable gw % allodnis is the percentage allocation of traffic for the destination (dnis) in question:

gwx=the gateway which the system is currently calculating gw % allodnis for gwtotal=total number of gateways in route for the destination gwlower=total number of gateways in route for the destination that have lower priority ranking than gwx gwlower %=gwlower*1% gwhigher %=total percent allocated to all gateways that are higher priority than gwx gw 100% allodnis=the lesser of maxdnis % and 100%−gwlower % gw 99% allodnis=the lesser of maxdnis % and 100%−(gwlower %+gw100% allo)

gwx % allodnis=the lesser of maxdnis % and 100%−(gwlower %+(gwhigher %)

When gwhigher %+gw % allodnis for gwx+gwlower %>99%, then the gw % allodnis for gwx=1−(gwhigher %+gwlower %), and the gw % allodnis for all lower gateways=gwlower %.

Given the above described allocations, their verification/refinement will be described in connection with FIG. 6. At step 601 the allocations calculated according to the process depicted in FIG. 5 are tested for feasibility. Step 601 sums, for each gateway in route to the destination for which allocations were calculated in the process of FIG. 5, all of the proportional allocations, (which can also be conveniently expressed as allocation percentages) for each of the gateway's supported destinations, each multiplied by the predicted traffic for each destination. This results in the calculated expected traffic that the gateway will have to handle in the next time interval. Thus, using convenient variable names, the sums (gwx % allodnis*attdnis) are calculated for each gateway in route to the destination under consideration, where gwx % allodnis is the allocated percentage of the traffic for a given destination to gateway x, and attdnis is the overall traffic predicted for the given destination in the next time interval.

Continuing at step 601, if the sums of the products (gwx % allodnis*attdnis) for all destinations supported by the gateway gwx are greater than maxattgw, which is the allocation ceiling for the gateway gwx on a per gateway basis, then some of the allocated traffic to the gateway in question needs to be unallocated. This occurs at step 602, where the least profitable traffic is deallocated from the gateway until the product sum is less than maxattgw. Thus gwx % allodnis, starting with the destination (sometimes referred to as a "DNIS" hence the variable names) with the lowest $peratt will be reduced to RQLedge status until the product sum is below maxattgw. It is noted that maxattgw for each gateway in route to the destination under consideration is calculated at step 402 of FIG. 4, and is thus readily available to the step 601 analysis.

Given the adjusted allocations to the gateways from step 602, the allocation proportions for the affected destinations will change the allocation proportions of the process of FIG. 5. Precisely, the available capacity for the impacted gateways will decrease as to those lower profit destinations, throwing more of their traffic into gateways with a lower priority ranking, or to the SS7 column. Thus from step 604 process flow returns to step 501 (see FIG. 5) and the allocation proportions are recalculated using the now lower capacity values for impacted gateways. Flow continues once again in FIG. 5 through to step 509, and then again to step 601. This process continues iteratively until step 601 moves to step 603, and the existing allocations for all affected gateways are accepted. At this point the process flow returns to step 301 and the continuous diagnostic loop resumes processing.

What will next be described, with reference to some exemplary call data, will be the traffic prediction, or call attempt prediction process. Table A below contains some sample data from a data network based telephony system such as is depicted in FIG. 2. What is shown are the call attempts to the destination Mexico City, Mexico, for a given eight day period. The column headings x-8 through x-1 refer to the call attempt data from eight days prior to the current day through the day before the current day. This is an example of how historical data is used to predict the call attempts for the next time interval. In Table A the data is obviously organized into one-hour time intervals for ease of presentation. Preferred embodiments of the invention will utilize smaller time intervals for better granularity. Note from Table A that on day x-5, the call attempts in hour 4 (fifth row) were 850, and in hour 5 they were 1,240.

TABLE A

CALL DATA FOR ONE WEEK

| Mexico, Mexico City | x-8 | x-7 | x-6 | x-5 | x-4 | x-3 | x-2 | x-1 |
|---|---|---|---|---|---|---|---|---|
| Hour 0 | 1,373 | 1,471 | 1,509 | 1,369 | 1,053 | 1,207 | 1,079 | 1,180 |
| Hour 1 | 650 | 602 | 550 | 593 | 695 | 531 | 543 | 520 |
| Hour 2 | 307 | 273 | 759 | 573 | 754 | 498 | 497 | 233 |
| Hour 3 | 235 | 197 | 934 | 660 | 814 | 599 | 602 | 126 |
| Hour 4 | 167 | 123 | 1,092 | 850 | 878 | 808 | 760 | 88 |
| Hour 5 | 255 | 182 | 1,126 | 1,240 | 1,008 | 684 | 686 | 108 |
| Hour 6 | 216 | 204 | 1,089 | 982 | 1,009 | 737 | 767 | 207 |
| Hour 7 | 592 | 393 | 1,510 | 1,326 | 1,463 | 1,163 | 667 | 248 |
| Hour 8 | 1,114 | 1,048 | 2,256 | 2,122 | 2,055 | 2,062 | 927 | 555 |
| Hour 9 | 2,008 | 1,882 | 3,302 | 3,642 | 3,543 | 3,136 | 1,669 | 1,257 |
| Hour 10 | 2,855 | 3,158 | 5,324 | 6,112 | 5,069 | 4,383 | 2,594 | 2,267 |
| Hour 11 | 3,255 | 3,991 | 5,232 | 6,197 | 5,638 | 4,979 | 3,163 | 2,813 |
| Hour 12 | 3,712 | 4,190 | 5,352 | 4,987 | 5,054 | 4,463 | 3,061 | 5,437 |
| Hour 13 | 3,312 | 4,085 | 4,743 | 4,103 | 3,775 | 3,483 | 2,694 | 4,219 |
| Hour 14 | 3,253 | 3,900 | 3,561 | 4,007 | 3,527 | 3,205 | 2,731 | 2,908 |
| Hour 15 | 3,252 | 4,444 | 4,370 | 4,049 | 3,848 | 3,082 | 2,444 | 3,084 |
| Hour 16 | 3,307 | 4,815 | 4,519 | 4,378 | 4,340 | 3,417 | 2,634 | 3,315 |
| Hour 17 | 3,286 | 4,745 | 4,299 | 3,874 | 4,261 | 3,388 | 2,780 | 3,400 |
| Hour 18 | 3,462 | 5,422 | 3,809 | 3,352 | 3,959 | 3,513 | 2,765 | 4,267 |
| Hour 19 | 3,890 | 6,583 | 4,324 | 3,539 | 3,647 | 3,834 | 3,011 | 5,389 |
| Hour 20 | 5,114 | 10,189 | 5,459 | 3,965 | 3,842 | 3,995 | 3,542 | 7,020 |
| Hour 21 | 5,249 | 14,644 | 7,442 | 5,222 | 5,105 | 5,537 | 4,691 | 9,273 |
| Hour 22 | 5,322 | 14,697 | 7,375 | 5,353 | 5,417 | 5,744 | 5,420 | 8,097 |
| Hour 23 | 3,248 | 6,893 | 4,047 | 2,791 | 3,497 | 2,883 | 3,294 | 4,539 |
|  | x-8 | x-7 | x-6 | x-5 | x-4 | x-3 | x-2 | x-1 |

TABLE B

ANALYSIS OF CALL DATA FROM TABLE A

| x-7 Change | x-6 Change | x-5 Change | x-4 Change | x-3 Change | x-2 Change | x-1 Change | AVGCHANGE | MEDCHANGE | STDEV |
|---|---|---|---|---|---|---|---|---|---|
| −55% | −78% | −66% | −62% | −65% | −63% | −64% | −65% | −64% | 7% |
| −59% | −64% | −57% | −34% | −56% | −50% | −56% | −54% | −56% | 10% |
| −55% | 38% | −3% | 8% | −6% | −8% | −55% | −12% | −6% | 33% |
| −28% | 23% | 15% | 8% | 20% | 21% | −46% | 2% | 15% | 28% |
| −38% | 17% | 29% | 8% | 35% | 26% | −30% | 7% | 17% | 29% |
| 48% | 3% | 46% | 15% | −15% | −10% | 23% | 16% | 15% | 25% |
| 12% | −3% | −21% | 0% | 8% | 12% | 92% | 14% | 8% | 36% |
| 93% | 39% | 35% | 45% | 58% | −13% | 20% | 39% | 39% | 33% |
| 167% | 49% | 60% | 40% | 77% | 39% | 124% | 80% | 60% | 48% |
| 80% | 46% | 72% | 72% | 52% | 80% | 126% | 76% | 72% | 26% |
| 68% | 61% | 68% | 43% | 40% | 55% | 80% | 59% | 61% | 14% |
| 26% | −2% | 1% | 11% | 14% | 22% | 24% | 14% | 14% | 11% |
| 5% | 2% | −20% | −10% | −10% | −3% | 93% | 8% | −3% | 38% |
| −3% | 11% | −18% | −25% | −22% | −12% | −22% | −16% | −18% | 8% |
| −5% | −25% | −2% | −7% | −8% | 1% | −31% | −11% | −7% | 12% |
| 14% | 23% | 1% | 9% | −4% | −11% | 6% | 6% | 6% | 11% |
| 8% | 3% | 8% | 13% | 11% | 8% | 7% | 8% | 8% | 3% |
| −1% | −5% | −12% | −2% | −1% | 6% | 3% | −2% | −1% | 5% |
| 14% | −11% | −13% | −7% | 4% | −1% | 26% | 2% | −1% | 14% |
| 21% | 14% | 6% | −8% | 9% | 9% | 26% | 11% | 9% | 11% |
| 55% | 26% | 12% | 5% | 4% | 18% | 30% | 22% | 18% | 18% |
| 44% | 36% | 32% | 33% | 39% | 32% | 32% | 35% | 33% | 4% |
| 0% | −1% | 3% | 6% | 4% | 16% | −13% | 2% | 3% | 8% |
| −53% | −45% | −48% | −35% | −50% | −39% | −44% | −45% | −45% | 6% |
| x-7 Change | x-6 Change | x-5 Change | x-4 Change | x-3 Change | x-2 Change | x-1 Change | AVGCHANGE | MEDCHANGE | STDEV |

Table B depicts the analysis of the data presented in Table A. The daily hour by hour percent changes in traffic are displayed. Thus, for example, Hour 5 (sixth row in column x-5 change provides the change from the fourth hour to the fifth hour on day x-5, or five days prior to the current day, or 46%. As indicated above this result is due to the fact that the traffic on that day from hour 4 to hour 5 increased from 850 to 1,240; thus (1240−850)/850=46%. Table B also displays the average, median and standard deviation of the hourly traffic changes for the sample week. Using this data, the traffic for the next time interval, here an hour, can be predicted, as will be next described with reference to Table C.

TABLE C

CALL TRAFFIC FORECASTING

| LINTREND | Today (Current) | LINFORECAST | AVGFORECAST | MEDFORECAST | FORECAST | MOD INPUT | CONCLUSION |
|---|---|---|---|---|---|---|---|
| −0.64 | 1713 | 1,620 | 1,598 | 1,626 | 1,598 | 1 | 1,598 |
| −0.48 | 581 | 888 | 796 | 754 | 796 | 1 | 796 |
| −0.26 | 397 | 433 | 513 | 545 | 513 | 1 | 513 |
| −0.06 | 184 | 375 | 405 | 457 | 405 | 1 | 405 |
| 0.13 | 136 | 209 | 196 | 215 | 196 | 1 | 196 |
| −0.08 | 111 | 126 | 157 | 156 | 157 | 1 | 157 |
| 0.57 | 130 | 174 | 127 | 120 | 127 | 1 | 127 |
| −0.03 | 234 | 126 | 181 | 180 | 181 | 1 | 181 |
| 0.61 | 757 | 376 | 420 | 374 | 420 | 1 | 420 |
| 1.02 | 1712 | 1,533 | 1,305 | 1,305 | 1,533 | 1 | 1,533 |
| 0.59 | 2913 | 2,723 | 2,728 | 2,760 | 2,723 | 1 | 2,723 |
| 0.21 | 4184 | 3,535 | 3,316 | 3,309 | 3,316 | 1 | 3,316 |
| 0.46 | 6803 | 6,097 | 4,525 | 4,049 | 4,525 | 1 | 4,525 |
| −0.25 | 6900 | 5,069 | 5,702 | 5,597 | 5,702 | 1 | 5,702 |
| −0.16 | 4496 | 5,828 | 6,150 | 6,447 | 6,150 | 1 | 6,150 |
| −0.08 | 4941 | 4,133 | 4,743 | 4,768 | 4,743 | 1 | 4,743 |
| 0.10 | 5058 | 5,419 | 5,356 | 5,342 | 5,419 | 1 | 5,419 |
| 0.04 | 5799 | 5,283 | 4,968 | 4,984 | 4,968 | 1 | 4,968 |
| 0.12 | 7623 | 6,491 | 5,890 | 5,768 | 5,890 | 1 | 5,890 |
| 0.12 | 12306 | 8,559 | 8,461 | 8,320 | 8,461 | 1 | 8,461 |
| 0.07 | 15455 | 13,219 | 14,952 | 14,476 | 14,952 | 1 | 14,952 |
| 0.30 | 28388 | 20,135 | 20,925 | 20,536 | 20,135 | 1 | 20,135 |
| 0.01 | 28389 | 28,780 | 28,983 | 29,100 | 28,983 | 1 | 28,983 |
| −0.40 | 11895 | 17,148 | 15,634 | 15,578 | 15,634 | 1 | 15,634 |
| LINTREND | Today (Current) | LINFORECAST | AVGFORECAST | MEDFORECAST | FORECAST | MOD INPUT | CONCLUSION |

In table C, the column LINTREND has calculations of the trend using a linear growth function. As an example, the linear growth function FORECAST, available in Microsoft Excel™ is used. The next column has the actual data, obviously unavailable at the time the forecasting had to be done, but included herein for comparison with the forecast predictions.

In the next column, LINFORECAST, the hourly traffic is forecast using the historical linear traffic growth relationship and the actual traffic value for the previous hour. The formula for any row in the column is {(previous hour traffic)+[(previous hour traffic)*LINTREND)]}. AVGFORECAST and MEDFORECAST are similarly calculated, using the sum of the prior hour's traffic and the product of the prior hour's traffic with AVGCHANGE or MEDCHANGE, as the case may be.

The last three columns operate as follows. The FORECAST column chooses the better match from the available forecast results. Here the criterion used to choose is the following equation: IF STDEV>AVGCHANGE/2 THEN AVGFORECAST, ELSE LINFORECAST, but this is merely exemplary, and rather heuristic. In preferred embodiments the criterion should be chosen empirically. As can be seen, this criterion nearly always chose the AVGFORECAST value. In preferred embodiments the system will develop a genetic algorithm, which measures the success of the prediction algorithm by assigning a score to the algorithm. By parameterizing the prediction algorithm in terms of the score function, this drives the prediction algorithm to self modify towards better predictive accuracy.

The MOD INPUT column allows the network operator to multiply the FORECAST value by a "fudge" factor, to better model anomalies or events unknown to the system's historical data (such as a terrorist event, unique special day, or natural disaster) which would tend to increase or decrease call attempts. The final output CONCLUSION is simply FORECAST*MOD INPUT.

CONCLUSION is then used in the calculations of FIG. 5, entering the equations as TE, the expected traffic value (after reorganizing the raw historical data into a time interval compatible with the allocation process).

It is noted that the example of call prediction depicted in Tables A–C is for illustrative purposes, and thus simplified for ease of presentation. Real world embodiments will use much larger historical data pools as well as numerous other forecasting algorithms, both linear and nonlinear, as are or may be known. The continuing objective being to accurately predict the call traffic in the next time interval.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed:

1. In a telephony over data network system having a plurality of destinations, a method of predicting call traffic to a given destination for a given next time interval, comprising:
   (a) evaluating historical call attempts to the destination at a first time interval immediately prior to the next time interval;
   (b) evaluating the historical call attempts to the destination at a second time interval immediately preceding the first time interval;
   (c) forecasting the call attempts for said next time interval utilizing a plurality of algorithms whose inputs are at least (a) and (b), said algorithms being both linear and nonlinear forecasting methods;
   (d) selecting one of the forecasting results from (c).

2. The method of claim 1, wherein said plurality of algorithms include at least one of linforecast, avgforecast, medforecast and dowforecast.

3. The method of claim 1, wherein said step of selecting is done automatically by the system.

4. The method of claim 1, wherein said step of selecting is done by a system operator.

5. The method of claim 3, wherein a system operator can specify a factor by which the selected forecasting result is multiplied to correct for anomalous situations or events not adequately modeled by the forecasting algorithms.

6. The method of claim 4, wherein a system operator can specify a factor by which the selected forecasting result is multiplied to correct for anomalous situations or events not adequately modeled by the forecasting algorithms.

7. In a telephony over data network system having a plurality of destinations, a method of predicting call traffic to a given destination for a given next time interval, comprising:
   (a) providing a plurality of gateways each adapted for receiving calls and terminating at least one call among the calls to the given destination remote to the plurality of gateways;
   (b) evaluating historical call attempts to the destination at a first time interval immediately prior to the next time interval;
   (c) evaluating the historical call attempts to the destination at a second time interval immediately preceding the first time interval;
   (d) forecasting the call attempts for said next time interval utilizing a plurality of algorithms whose inputs are at least (b) and (c), said algorithms being both linear and nonlinear forecasting methods;
   (e) selecting one of the forecasting results from (d);
   (f) changing call traffic volume passing through at least one gateway among the plurality of gateways based upon the selected results.

8. The method of claim 7, wherein said plurality of algorithms include at least one of linforecast, avgforecast, medforecast and dowforecast.

9. The method of claim 7, wherein said step of selecting is done automatically by the system.

10. The method of claim 7, wherein said step of selecting is done by a system operator.

11. The method of claim 9, wherein a system operator can specify a factor by which the selected forecasting result is multiplied to correct for anomalous situations or events not adequately modeled by the forecasting algorithms.

12. The method of claim 10, wherein a system operator can specify a factor by which the selected forecasting result is multiplied to correct for anomalous situations or events not adequately modeled by the forecasting algorithms.

* * * * *